(No Model.)
W. BUTTLER.
GLASS TILE.
No. 394,910. Patented Dec. 18, 1888.
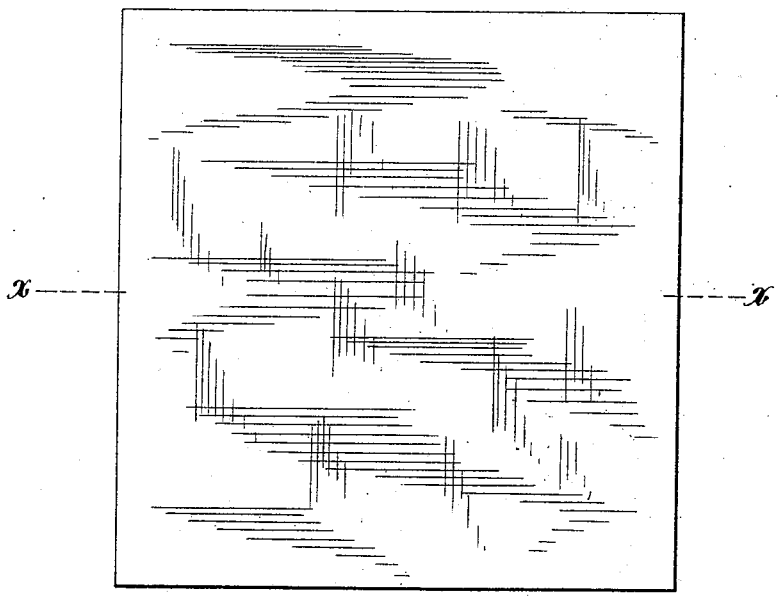
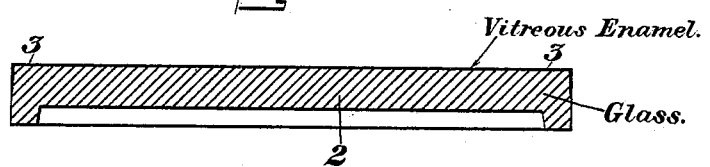
WITNESSES.
INVENTOR.

UNITED STATES PATENT OFFICE.

WILLIAM BUTTLER, OF PITTSBURG, PENNSYLVANIA, ASSIGNOR TO THE BUTTLER ART GLASS COMPANY, OF FOSTORIA, OHIO.

GLASS TILE.

SPECIFICATION forming part of Letters Patent No. 394,910, dated December 18, 1888.

Application filed September 8, 1887. Serial No. 249,145. (No specimens.)

*To all whom it may concern:*

Be it known that I, WILLIAM BUTTLER, of Pittsburg, in the county of Allegheny and State of Pennsylvania, have invented a new and useful Improvement in Glass Tiles; and I do hereby declare the following to be a full, clear, and exact description thereof, reference being had to the accompanying drawings, in which—

Figure 1 is a plan view of a glass tile constructed according to my invention. Fig. 2 is a vertical cross-section on the line $x\,x$ of Fig. 1.

Like symbols of reference indicate like parts in each.

Heretofore glass tiles have been made of solid glass simply pressed into the desired shape, and while they are very useful for many purposes their surfaces lack that brilliancy and luster which are so desirable for decorative purposes.

My improvement consists in such tile provided with a surface coating of glaze or enamel, which fills up the slight irregularities of the surface and gives it a smooth and beautiful appearance.

In order to make glass tiles according to my invention, I take them after they have been pressed and coat their faces with a liquid glazing or enamel compound of a suitable color, preferably by dipping them into a vessel containing the compound. This liquid is a compound of the sort used for glass-painting, and contains mineral substances which fuse together at a comparatively low degree of heat, and which, when fused, vitrify and unite with the surface of the glass, which softens, but does not fuse at the fusing temperature of the glass or enamel. These substances are mixed with oil and turpentine to the proper consistence, and the mixture is then preferably applied by dipping the surface of the tile thereinto. The tile is then removed, and after the liquid has set it is taken to an oven and burned in the usual way.

In the drawings, 2 represents the body of a glass tile which has been so made, and 3 is the facing of vitreous enamel which is integral therewith.

The advantage of my improvement is that I produce a tile with enameled surface which is not apt to crack or to break off from the body of the tile. Heretofore enameled tile had a backing made of clay, and because of the different properties of the vitreous facing and the clay body they are apt to expand and contract differently under the influence of heat, and when in use the absorption of moisture by the porous-clay backing swells it, while the dense vitreous facing is not affected thereby. The tile is also subjected to moisture in the operation of setting, because it absorbs moisture from the plaster, and it is customary to dip the tile in water to moisten it before it is laid. These causes often make the enamel to crack and soon spoil the beauty and usefulness of the tile. With my improved tile this is not the case, because both the facing and the body of the tile are of vitreous substance, and therefore are affected in the same degree by the action of heat and moisture. The tiles are therefore much more durable than those heretofore made.

I claim—

As a new article of manufacture, a tile or block for decorative purposes having an outer skin of vitreous glazing or enamel and a backing of pressed or molded glass, to which the glazing or enamel is applied and fused, whereby the said skin or facing is preserved unaffected by the influence of heat and moisture, substantially as and for the purposes described.

In testimony whereof I have hereunto set my hand this 6th day of September, A. D. 1887.

WILLIAM BUTTLER.

Witnesses:
W. B. CORWIN,
THOMAS W. BAKEWELL.